(12) United States Patent
Margol et al.

(10) Patent No.: US 11,145,087 B2
(45) Date of Patent: Oct. 12, 2021

(54) OPTIMIZED FORWARD-FACING CAMERA CALIBRATION SYSTEM WITH PORTABLE MOUNTING APPARATUS AND ADAPTABLE ELECTRONIC CALIBRATION TARGET DISPLAY

(71) Applicant: AIRPRO DIAGNOSTICS, LLC, Jacksonville, FL (US)

(72) Inventors: Lonnie E. Margol, Jacksonville, FL (US); Geoffrey R. Margol, Atlantic Beach, FL (US); Charles P. Olsen, St. Johns, FL (US); Jonathan Z. Brigman, Jacksonville, FL (US); Stephen Casella, Sunrise, FL (US); Harold Koegler, Jacksonville, FL (US); Eric Thomas Newell, Lowell, IN (US); Sean M. Parr, Middleburg, FL (US); Clayton Rush Williams, Jacksonville, FL (US); Joshua Lee McFarlin, St. Johns, FL (US); Matthew John Mercier, Windermere, FL (US); John Burrill, Gotha, FL (US); Donovan Rahim Naghitorabi, Winter Garden, FL (US); Jules Marc Philipp Gozlan, Palm Beach, FL (US); Christopher Joel Cimino, Jacksonville, FL (US)

(73) Assignee: AirPro Diagnostics, LLC, Jacksonville, FL (US)

( * ) Notice: Subject to any disclaimer, the term of this patent is extended or adjusted under 35 U.S.C. 154(b) by 0 days.

(21) Appl. No.: 16/839,409

(22) Filed: Apr. 3, 2020

(65) Prior Publication Data
US 2020/0320742 A1  Oct. 8, 2020

Related U.S. Application Data

(60) Provisional application No. 62/893,946, filed on Aug. 30, 2019, provisional application No. 62/829,335, filed on Apr. 4, 2019.

(51) Int. Cl.
*G06T 7/80* (2017.01)
*B60R 1/00* (2006.01)
(Continued)

(52) U.S. Cl.
CPC .................. *G06T 7/80* (2017.01); *B60R 1/00* (2013.01); *B60R 11/0229* (2013.01);
(Continued)

(58) Field of Classification Search
None
See application file for complete search history.

(56) References Cited

U.S. PATENT DOCUMENTS 6,542,840 B2   4/2003  Okamoto et al.
9,794,552 B1 * 10/2017  Ribble ................ H04N 17/002
(Continued)

FOREIGN PATENT DOCUMENTS

CN   109163889 A   1/2019
EP     3373037 A1   9/2018

*Primary Examiner* — Reza Aghevli
(74) *Attorney, Agent, or Firm* — Laurence A. Greenberg; Werner H. Stemer; Ralph E. Locher

(57) ABSTRACT

A system and method for calibrating a forward-facing camera or sensor of a vehicle is provided. The system includes a calibration tool, the position of which can be adjusted on the vehicle to align a presentation screen of the calibration tool with the vehicle camera. A processor performs a method to determine the size and position of a calibration target to be displayed on the presentation screen, based on a position of the calibration tool relative to the vehicle camera and generates a calibration target image to be digitally transmitted to the presentation screen. The presentation screen displays the calibration target image at an appropriate height, angle, and distance from the camera or sensor being calibrated.

21 Claims, 14 Drawing Sheets

(51) Int. Cl.
  *B60R 11/04* (2006.01)
  *B60R 11/02* (2006.01)
  *B60R 11/00* (2006.01)

(52) U.S. Cl.
  CPC ......... *B60R 11/04* (2013.01); *B60R 2011/004* (2013.01); *B60R 2011/0056* (2013.01); *B60R 2300/10* (2013.01); *B60R 2300/20* (2013.01); *B60R 2300/402* (2013.01); *G06T 2207/30204* (2013.01); *G06T 2207/30252* (2013.01)

(56) References Cited

U.S. PATENT DOCUMENTS

| | | | | |
|---|---|---|---|---|
| 10,552,983 | B1 * | 2/2020 | Slobodyanyuk | G06T 7/80 |
| 10,595,005 | B2 | 3/2020 | Kapuria et al. | |
| 2009/0033926 | A1 | 2/2009 | Haug | |
| 2013/0222607 | A1 * | 8/2013 | Oshima | H04N 17/002 348/188 |
| 2014/0098229 | A1 * | 4/2014 | Lu | G06T 7/33 348/148 |
| 2014/0247354 | A1 * | 9/2014 | Knudsen | B60R 1/00 348/148 |
| 2014/0320658 | A1 * | 10/2014 | Pliefke | G06T 7/80 348/148 |
| 2014/0350834 | A1 * | 11/2014 | Turk | B60R 1/00 701/300 |
| 2015/0049188 | A1 * | 2/2015 | Harrell | F16M 11/38 348/139 |
| 2015/0049193 | A1 * | 2/2015 | Gupta | G03B 43/00 348/148 |
| 2015/0049199 | A1 * | 2/2015 | Rogers | H04N 5/23238 348/148 |
| 2015/0145999 | A1 * | 5/2015 | Kim | B60R 1/00 348/148 |
| 2016/0018889 | A1 * | 1/2016 | Skogo | G06K 9/2018 348/78 |
| 2016/0161602 | A1 * | 6/2016 | Prokhorov | G01S 7/4026 702/97 |
| 2018/0108150 | A1 * | 4/2018 | Curtis | H04N 13/246 |
| 2019/0028632 | A1 * | 1/2019 | Nobori | G06K 9/00805 |
| 2019/0078894 | A1 * | 3/2019 | Waldron | H04N 5/332 |
| 2019/0147622 | A1 * | 5/2019 | Li | B64C 39/024 382/154 |
| 2019/0172225 | A1 * | 6/2019 | Park | G01C 21/3602 |
| 2019/0204427 | A1 * | 7/2019 | Abari | G01S 17/931 |
| 2020/0088515 | A1 * | 3/2020 | Rogers | B60R 1/00 |
| 2020/0130188 | A1 * | 4/2020 | Lawrence | B25J 5/02 |
| 2020/0158840 | A1 * | 5/2020 | Ikram | G01S 17/931 |
| 2020/0211226 | A1 * | 7/2020 | Du | G06K 9/00818 |
| 2020/0353969 | A1 * | 11/2020 | Sypitkowski | B62D 15/028 |

* cited by examiner

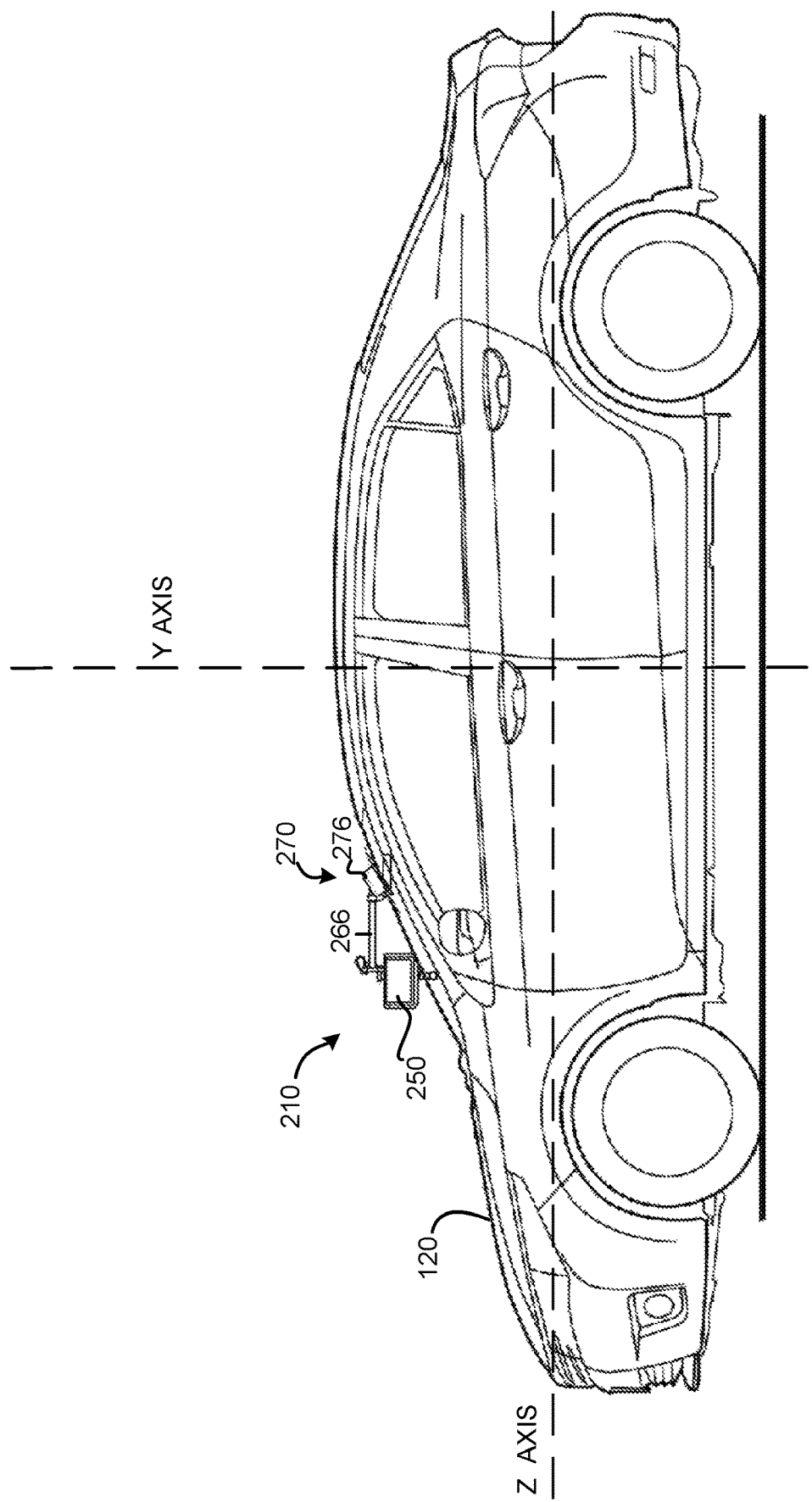

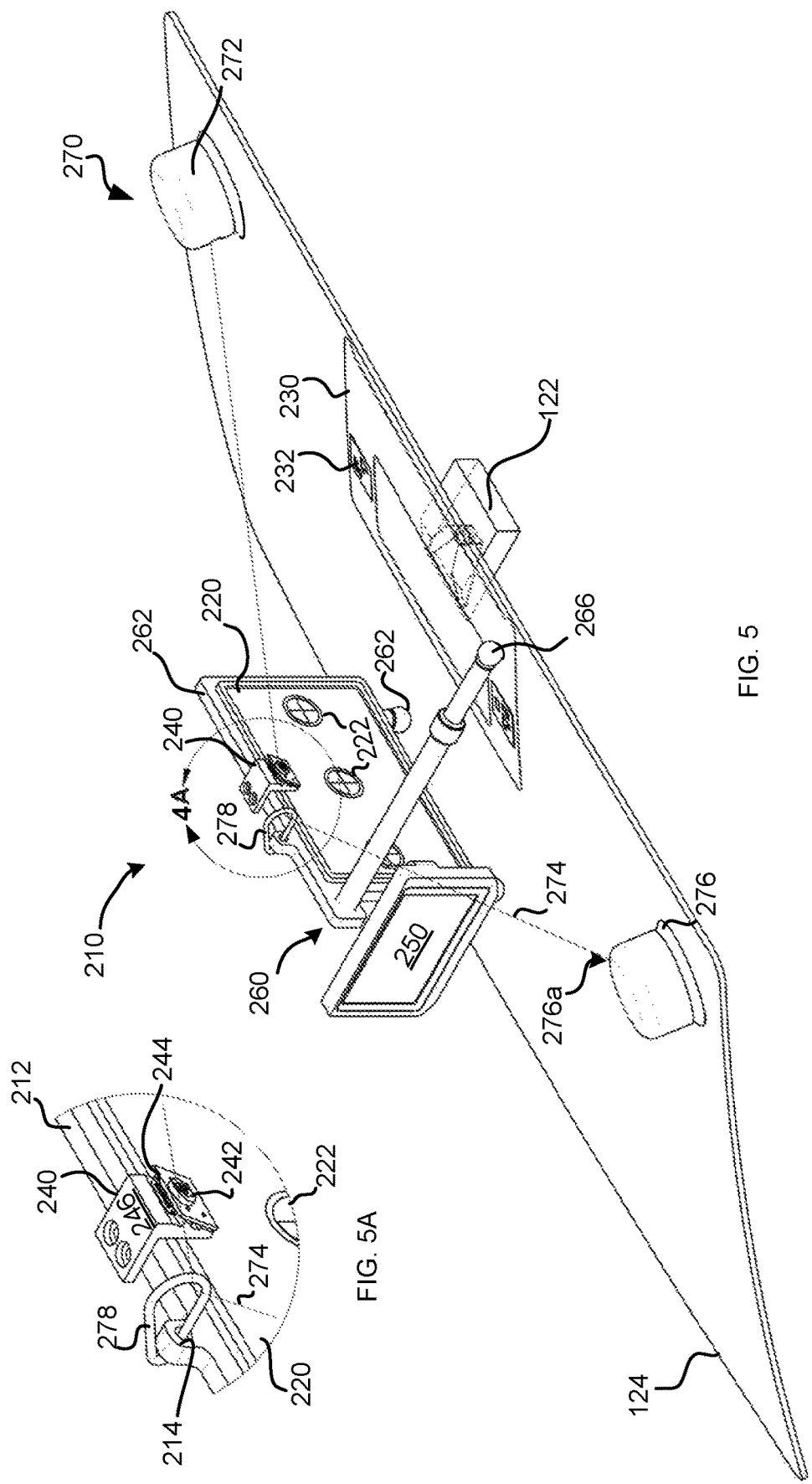

OPTIMIZED FORWARD-FACING CAMERA CALIBRATION SYSTEM WITH PORTABLE MOUNTING APPARATUS AND ADAPTABLE ELECTRONIC CALIBRATION TARGET DISPLAY

CROSS-REFERENCE TO RELATED APPLICATIONS

The present application claims priority to Provisional Patent Application No. 62/829,335, filed on Apr. 4, 2019, and to Provisional Patent Application No. 62/893,946, filed on Aug. 30, 2019, both applications entitled Optimized Forward-Facing Camera Calibration System With Portable Mounting Apparatus And Adaptable Electronic Calibration Target Display; those applications being incorporated herein, by reference, in their entireties.

BACKGROUND OF THE INVENTION

Field of the Invention

Modern vehicles have advanced driver assistance systems (ADAS) that assist the driver in managing the various tasks associated with operating a vehicle, including lane following, changing lanes, maintaining a following distance, emergency situational awareness, and maintaining an appropriate speed. ADAS depends, in part, on forward-facing cameras (FFCs) to monitor road conditions and to detect cars and various other objects of interest to the driver. The FFCs provide information to the ADAS which generates real time road information and warnings to vehicle modules and the driver. The original equipment manufacturer (OEM) requires recalibration of the FFC after a collision, windshield replacement, or in some cases, routine service.

Conventional methods of calibrating the ADAS requires precise placement of visual alignment targets in a carefully controlled environment, and within a substantially sized, indoor measured space. Physical targets designed for static testing are placed around this measured space to properly calibrate the FFC. Each OEM specifies the size and shape of the targets, the height of the targets and the distance from the FFC for their placement. Accordingly, a windshield replacement or collision repair facility would need to acquire many sets of targets and stands on which the targets will sit in order to calibrate various vehicle makes and models.

Due to the distance requirement a considerable amount of floor space is required. In addition, the floor space is to be level or assisted by machines to level the vehicle and benefit from a controlled environment for lighting and reflective tolerances, etc. The facility requirement adds cost and time to the calibration process.

Most collision and windshield replacement facilities do not have available floor space at the dimensions necessary for meeting the environmental conditions for the FFC calibration. And all would appreciate avoiding the sizable investment in a multitude of targets and stands required for calibrating various makes and models. Instead, collision shops and windshield replacement companies are currently burdened with time consuming and costly transport of the vehicle to another facility, in many cases, OEM specified car dealerships that are appropriately equipped to undertake and complete the calibration process. The cost of calibration with these ancillary expenses increases by approximately 40%-50% and the time to complete the repair by approximately 2-4 days, resulting in more cost to the customer and its insurer.

What is needed is a calibration system for a vehicle's forward-facing camera that avoids the requirement for a multitude of targets and stands for calibrating various makes and models of vehicles. What is additionally needed is a calibration system for a vehicle's forward-facing camera that does not need a specially sized or configured facility in which to conduct the calibration. What is further needed is a field calibration system and method for forward-facing cameras, that can be used by windshield replacement technicians in the field, that reduces or eliminates the need to send vehicles to a special facility or the OEM dealer for calibration.

SUMMARY OF THE INVENTION

The present invention is particularly suited to overcome those problems that remain in the art in a manner not previously known or contemplated. It is accordingly an object of the invention to provide a forward-facing calibration system that will allow for calibration in a less controlled environment and within the footprint of the vehicle.

In one particular embodiment of the invention, a system and method for calibrating a forward-facing camera or sensor of a vehicle is provided. The system includes a calibration tool, the position of which can be adjusted on the vehicle to align a presentation screen of the calibration tool with the vehicle camera. A processor performs a method to determine the size and position of a calibration target to be displayed on the presentation screen, based on a position of the calibration tool relative to the vehicle camera and generates a calibration target image to be digitally transmitted to the presentation screen. The adaptable electronic calibration target display or presentation screen displays the calibration target image at an appropriate height, angle, and distance from the camera or sensor being calibrated.

According to one embodiment of the invention, an algorithm is used to determine the appropriate miniaturized size of OEM's specified targets for display at substantially shortened distances from the FFC, in order to conduct an alternate means of calibrating the FFC.

Other features which are considered as characteristic for the invention are set forth in the drawings, description and appended claims.

Although the invention is illustrated and described herein as embodied in an optimized forward-facing camera calibration system with portable mounting apparatus and adaptable electronic calibration target display, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which like reference numerals represent like items.

BRIEF DESCRIPTION OF THE DRAWING

FIG. 4B is a side plan view of a vehicle having an adaptable electronic calibration target display unit mounted thereon, in accordance with one particular embodiment of the invention;

FIG. 5 is a top-down, perspective view of an adaptable electronic calibration target display unit, in accordance with another embodiment of the invention, mounted on a vehicle windshield in alignment the vehicle's forward-facing camera;

FIG. 5A is an enlarged view of a portion of FIG. 5, illustrating the mounting of the camera and clip of the securing system to a frame of the adaptable electronic calibration target display unit, in accordance with one particular embodiment of the invention;

DESCRIPTION OF THE INVENTION

Figure 1:
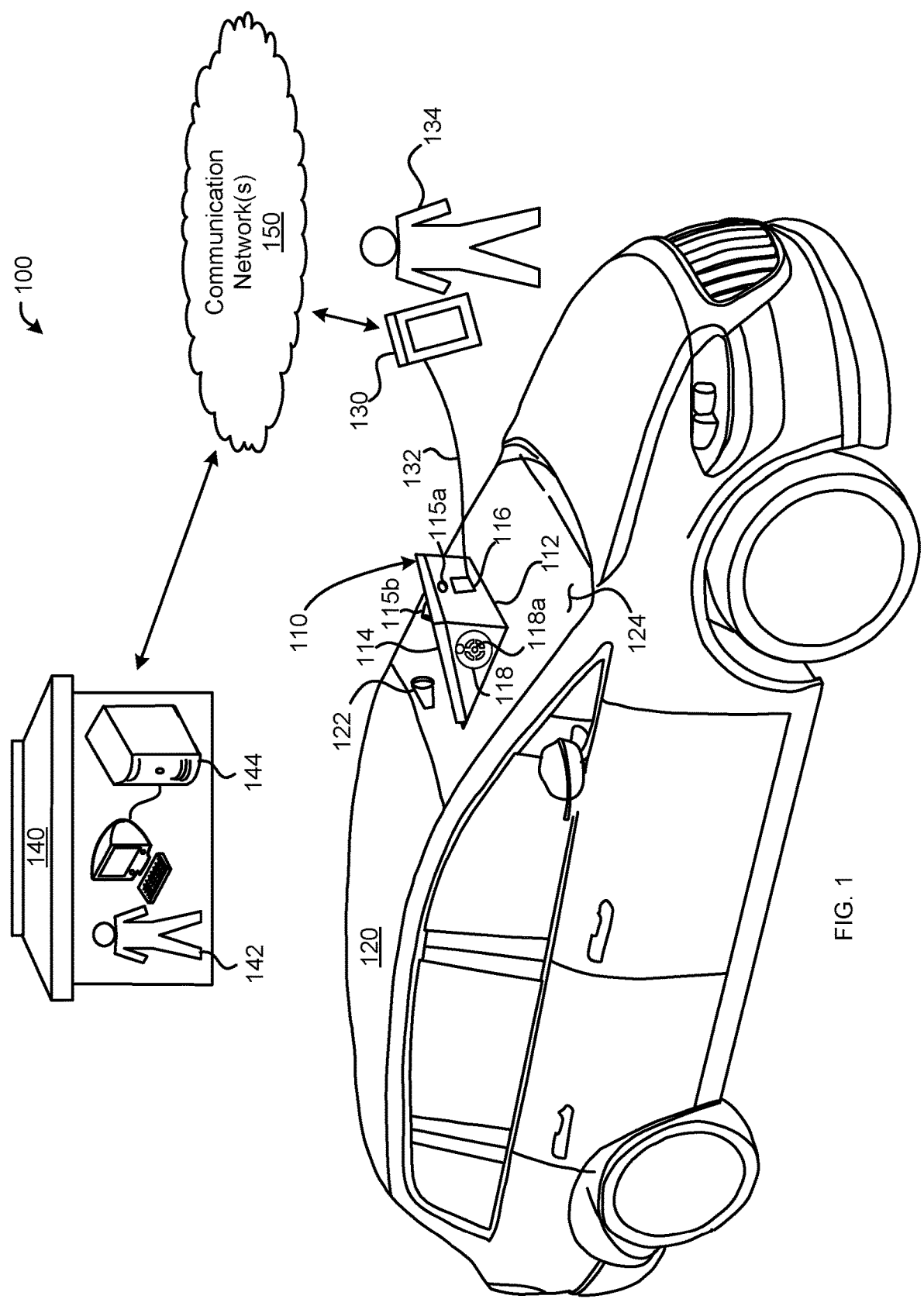
FIG. 1 is a simplified diagrammatic view of a system for calibrating a forward-facing camera of a vehicle using a portable mounting apparatus, in accordance with one particular embodiment of the invention.

A calibration system configured to calibrate an automotive camera system as part or an ADAS or other vehicle system is provided. Referring now to FIG. 1, there is shown a calibration system 100 for an onboard forward-facing camera or sensor (those terms used interchangeably herein), in accordance with one particular embodiment of the invention. An adaptable, electronic calibration tool 110 is affixed to a vehicle 120, relative to the vehicle's forward-facing camera or sensor (hereafter "FFC") 122, by way of a portable mounting apparatus 112. The calibration tool 110 includes, among other things, a presentation screen 114 directed to the forward-facing camera 122 of the vehicle 120, and a calibration system processor 116. In one particular embodiment, the presentation screen 114 is an electronic display device including a display screen, such as a flat panel LCD, LED or elnk display, which is used to display a digital image of the calibration target, as calculated and/or provided by the portable controller/driver 116. An algorithm of the system determines the target dimensions to be provided on the presentation screen 114 and identifies the placement of the presentation screen 114 and a calibration target image displayed on the presentation screen 114, at the appropriate height, angle, and distance from the FFC 120. In one particular embodiment of the invention, the algorithm is configured to reduce the target dimensions and distance from the forward-facing camera 122 by the same percentage. For example, if the calibration target size is reduced 20%, then the dimensions relating to the distance of the target from the forward-facing camera 122 (i.e., the height above/below the camera 122, the offset from the vehicle centerline, etc.) will also be reduced by 20% by the algorithm.

A diagnostic tool 130, operated by an operator 134 local to the vehicle 120, controls the size of a static calibration target to be displayed on the display 114, using the portable controller/driver 116. The calibration system processor 116 will compute and/or recall the specific miniaturized calibration target(s) required for the subject vehicle make and model, and indicate the appropriate placement position of the presentation screen 114 (and thus the unit 110) relative to the FFC 122, for calibration. In one particular embodiment of the invention, the calibration system processor 116 is loaded with simple, open source software that enables the presentation screen 114 to display a document or image (similar to how Adobe viewer allows users to view a PDF document). For example, the calibration system processor 114 can be provided with the calibration target image to be displayed. In another particular embodiment, the software and the presentation screen 114 are provided by elnk. In one particular embodiment of the invention, the calibration system processor 116 is approximately 2" tall by 2.5" wide and is mounted to the back of the frame that houses an elnk presentation screen 114. The calibration system processor 116 connects to the diagnostic tool 130 via cable 132, such as a USB-C cable, via which a remote technician 142 at a remote location 140 can load/adjust calibration targets via a communications network 150. In one particular embodiment, the calibration system processor 116 is basically a printed circuit board (PCB) configured to operate the presentation screen 114. Functionality can be added to an existing PCB of the system in order to control the lighting and, if needed, movement. Alternately, or in addition, a custom PCB can be created to support all of the functionality required. Additionally, in a preferred embodiment, the calibration system processor 116 includes a processing device, such as a microprocessor or computer processor, and system memory in signal communication with the processing device, for storing and running software to perform the algorithm of the invention.

Additionally, the calibration system processor 116 is the PCB that serves as the "hub" between the diagnostic tool 130 and the presentation screen 114 and mount 112 (i.e. controlling the screen 114, lighting, and movement of the presentation screen 114 via the mount 112). The driver 116 is connected to the diagnostic tool 130 via the cable 132, as shown, and in addition to providing power and controlling the presentation screen 114, this is how the technician 142 at the remote location 140 is able to control the calibration tool 110, remotely, using one or more computer(s) 144.

The presentation screen 114 displays a sharp rendering of the specified calibration target(s) at a miniaturized size with a contrast ratio similar to the output of a high-resolution printer.

The portable mounting apparatus 112 is the mechanism by which the presentation screen 114 is affixed to the vehicle 120 at the precise location required for proper calibration of the FFC 122. The portable mounting apparatus 112 includes a mechanical positioning system that will adjust the display horizontally, vertically, and for pitch, as needed, to account for subject vehicle type. In one particular embodiment of the invention, the alignment mechanism includes one or more handwheels 118 affixed to one or more threaded rods or positioning screws 118*a* in the portable mounting apparatus 112 that move the display 114 along an x-axis and or y-axis, as with a milling machine. Turning handwheel 118 turns the threaded rod 118*a*, which converts rotary motion to linear movement in order to position the screen 114 at a desired location relative to the FFC 122, on the windshield 124 of the vehicle 120. In another embodiment of the invention, one or more stepper motors are used to turn one or more threaded rod(s), similar to how a CNC Machine or 3D printer move. The remote technician 142 will be able to adjust the location of the scaled down calibration target on the presentation screen 114 (up, down, left, & right) through simple open source software that was loaded onto the calibration system processor 116.

Using the system of the invention, a large number of calibration target sizes and distances can be used relative to the FFC 122, because there is an inverse proportional relationship between the size of the presentation screen 114 and the amount of horizontal, vertical, and lateral motion (motion driven by threaded rods) required. It will be optimal to minimize or eliminate as much motion as possible, as motors and related components will increase the: amount of maintenance required, weight of the final design, complexity and power to operate the invention. At the same time, as the size of the screen gets larger it will increase the size and affect the mobility of the invention, as well as increase the cost to produce.

The calibration tool 110 additionally includes one or more cameras. In one embodiment, the calibration tool 110 includes at least two cameras 115*a*, 115*b*-*a* first camera 115*a* is installed in the calibration tool 110 facing the vehicle 120, and a second camera 115*b* is installed facing the vehicle's FFC 122. Each camera 115 includes an image sensor and hardware and/or software to process image data obtained by the image sensor. Software stored in the calibration tool 110 and, more specifically, in non-transitory memory of the calibration system processor 116, and executed by the processor 116, is configured to control the cameras 115. In one particular embodiment, the software uses machine vision to identify the center of the lens of the FFC 122 of the vehicle 120, which will serve as the fixed reference point for the proper alignment and location of the miniaturized/digital calibration target(s) displayed on the screen 114 of the calibration tool 110.

In one particular embodiment of the invention, the diagnostic tool 130 is configured to complete the calibration of a FFC 122 using OEM software. In the past, this was done by setting up full-size calibration targets in the correct location, height, lighting, environment, etc. and then having a technician run the calibration software, via a tool. However, with the present invention, OEM software can be used, and complete calibrations performed in a similar fashion to how they are currently performed by a remote technician. The present invention advantageously provides a portable solution with miniaturized calibration targets, and environmental controls (self-contained lighting and a shroud to prevent outside light/shadows from disrupting a calibration).

Affixing the apparatus 110 directly to the vehicle 120, according to the present invention, eliminates the need to: check and adjust tire pressure, fill the gas tank to the specified level, confirm the floor is a level surface/work only on a level floor, and several other arduous and time-consuming steps required in existing calibration protocols; thereby simplifying the process which in turn leads to considerable time and money savings.

Figure 2:
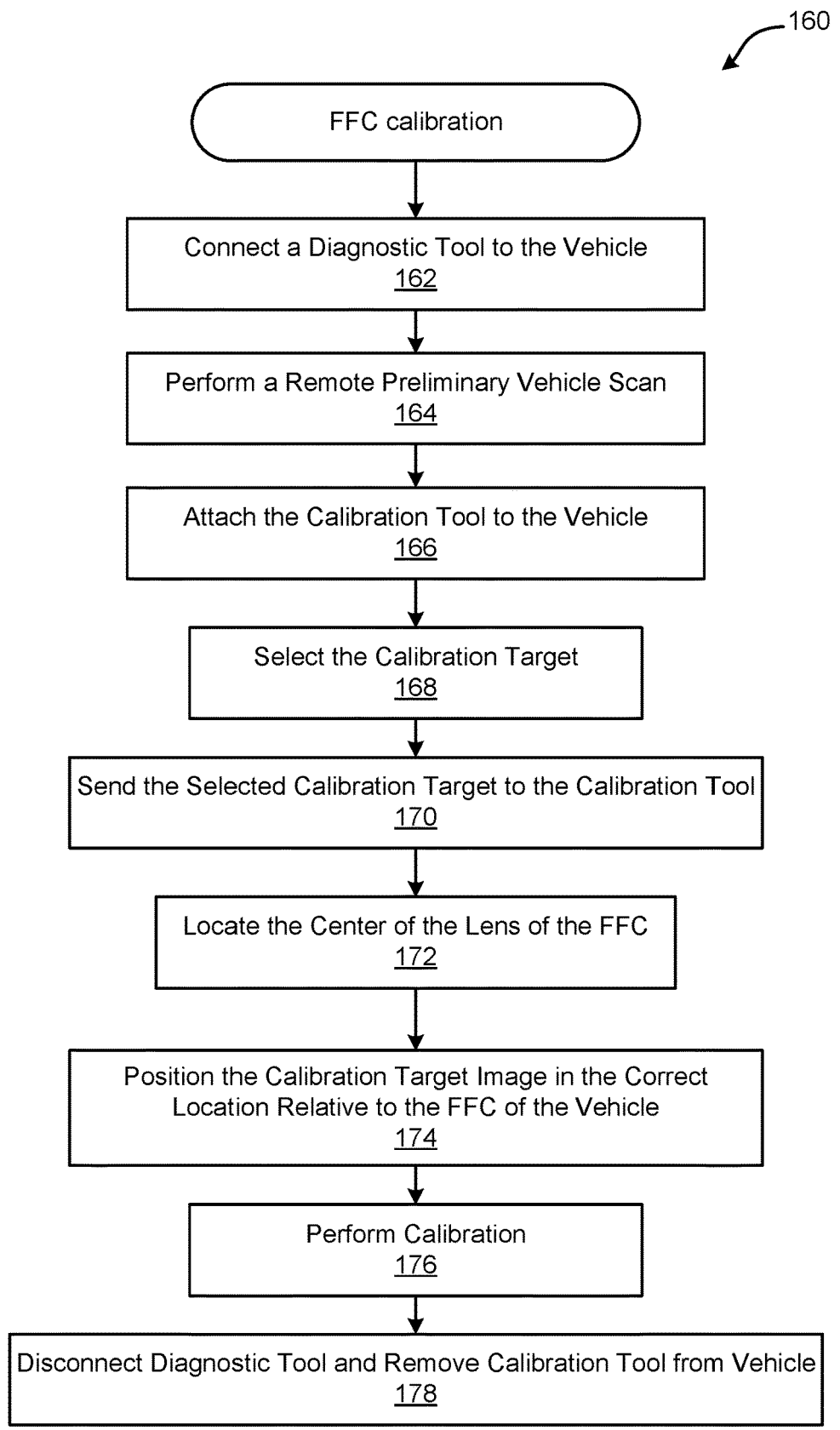
FIG. 2 is a simplified flow diagram of a method for using the system of FIG. 1, in accordance with one particular embodiment of the invention.

Referring now to FIGS. 1 and 2, a method 160 for performing a calibration process in accordance with one particular embodiment of the invention will now be described. In the present preferred embodiment, the calibration is undergone using a calibration tool 110, accessed from a remote location 140.

First, a diagnostic device 130 is connected to vehicle 120. Step 162 In one particular embodiment of the invention, the diagnostic/calibration device 130 will be used as the interface between the calibration tool 110 (including the calibration system processor 116 that provides an input signal to the presentation screen 114) and the technician 142 and/or OEM software that is performing the calibration remotely from the remote location 140. As such, in the present embodiment, although the calibration is performed using a unit 110 and tool 130 local to the vehicle 120, it is performed by a remote technician 142 communicating with the tool 130.

The remote technician 142 will conduct a preliminary (basic) scan to check for any Diagnostic Trouble Codes (DTC), using a computer 144 remote from the vehicle that communicates with the diagnostic device 130 via a communications network 150. Step 164. Many vehicle manufacturers require this preliminary scan before allowing the calibration of the FFC 122, because, in most cases, a calibration cannot be performed if there are any DTC's (Diagnostic Trouble Codes) present, other than the DTC for the specific calibration in question.

A local operator 134 (i.e., local to the vehicle 120) attaches the calibration tool 110 to the windshield 124 of the vehicle 120, while the preliminary scan is running. In one particular embodiment of the invention, calibration tool 110 is affixed to the windshield 124 of the vehicle 120 windshield by attaching the suction cup(s) directly above the FFC 122. Step 166. In one embodiment, two support legs are provided that will also attach to the windshield 124 via suction cups, on the windshield—i.e., about ½ the distance from the FFC 122 to the vehicle's hood—to support the calibration device 110 and keep the device 110 level on the vehicle 120. Other methods of attaching the calibration tool 110 to the windshield 124, or even the vehicle hood, can be used without departing from the spirit of the present invention.

Then, the remote technician 142 will select the necessary digital/miniaturized calibration target(s) and measurements (based on vehicle's make, model, & year) from an ADAS Library. Step 158. The selected digital calibration target and measurements will then be transmitted to the to the diagnostic tool 130, and from the diagnostic tool 130 to the calibration tool 110. Step 170. In one particular embodiment, the diagnostic tool 130 communicates with the calibration tool 110 via a cable 132. In another particular embodiment, the diagnostic tool 130 communicates wirelessly with the calibration tool 110, using a known communication standard, such as BLUETOOTH™ or via WIFI.

The calibration target image is then positioned in the correct location relative to the FFC 122 of the vehicle 120.

In one particular embodiment, the second camera 115b of the calibration tool 110 is used to locate the center of the lens of the forward-facing vehicle camera 122 (Step 172) and the calibration unit 110 is positionally adjusted (using the mechanical positioning system) so that the second camera 115b of the calibration tool 110 is centered with the lens of the FFC 122 (Step 174), so that the calibration tool 110 is at Point (0,0,0) on the X,Y,Z-Axis of the vehicle 120. Assigning this point (0,0,0) as the center of the lens of the FFC 122 allows the calibration target to be placed on the presentation screen 114 at the proper height, distance/scale, and offset (left or right of centerline) for all vehicles 120, even those having a FFC 122 that is not located on the vehicle's centerline.

In the present preferred embodiment, after the preliminary scan has been completed and the calibration tool 110 is properly set (including displaying an accurately positioned and scaled calibration target), the remote technician 142 will follow the calibration procedures outlined in the OEM vehicle manufacturer's service information to complete the calibration of the FFC 122 of the vehicle 120. In some cases, the calibration target will need to be repositioned during execution of the calibration process. In that case, in the present embodiment, the remote technician 142 will send the command to the calibration tool 110 for the calibration target image to be moved, and the calibration procedure will continue until successfully completed. Step 176.

In one particular embodiment of the invention, once the calibration procedure has been completed and the FFC 122 has been calibrated, the local operator 134 will be advised of the successful calibration by the remote technician 142 (either by phone call, text message, email, or message on tablet screen). Subsequently, the remote technician 142 will guide the local operator 134 through the process of disconnecting the diagnostic tool 130 from the vehicle 120, and will advise the local operator 134 to remove the calibration tool 110 from the vehicle 120. Step 178. If desired, the remote technician 142 can additionally provide the local operator 134 with manufacturer recommended test drive instructions for checking the proper functioning of the systems affected by the calibration that was just performed.

Figure 3:
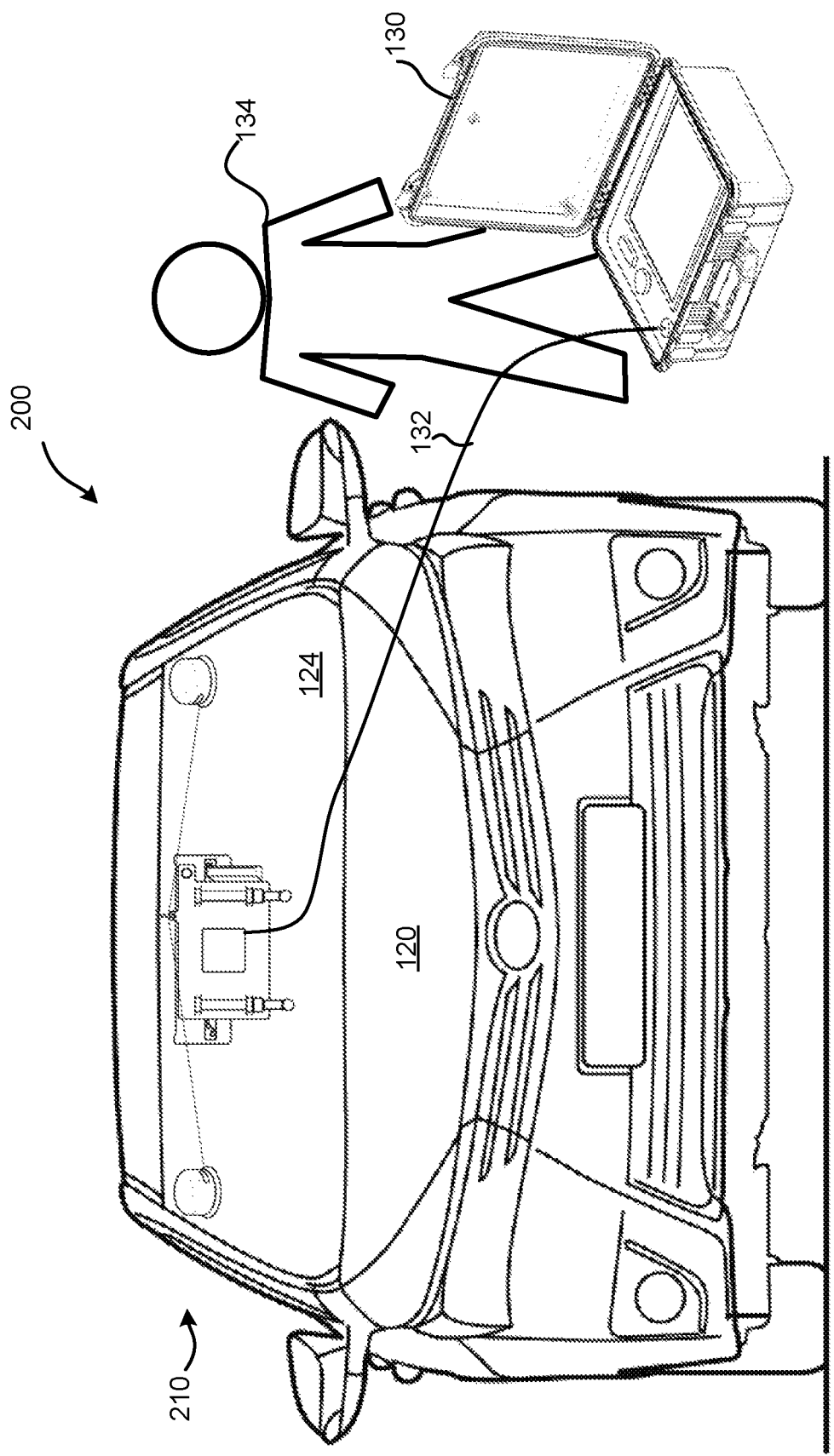
FIG. 3 is a simplified diagrammatic view of an automobile with an optimized forward-facing camera calibration system mounted thereon, in accordance with one particular preferred embodiment of the invention.
Figure 4A:
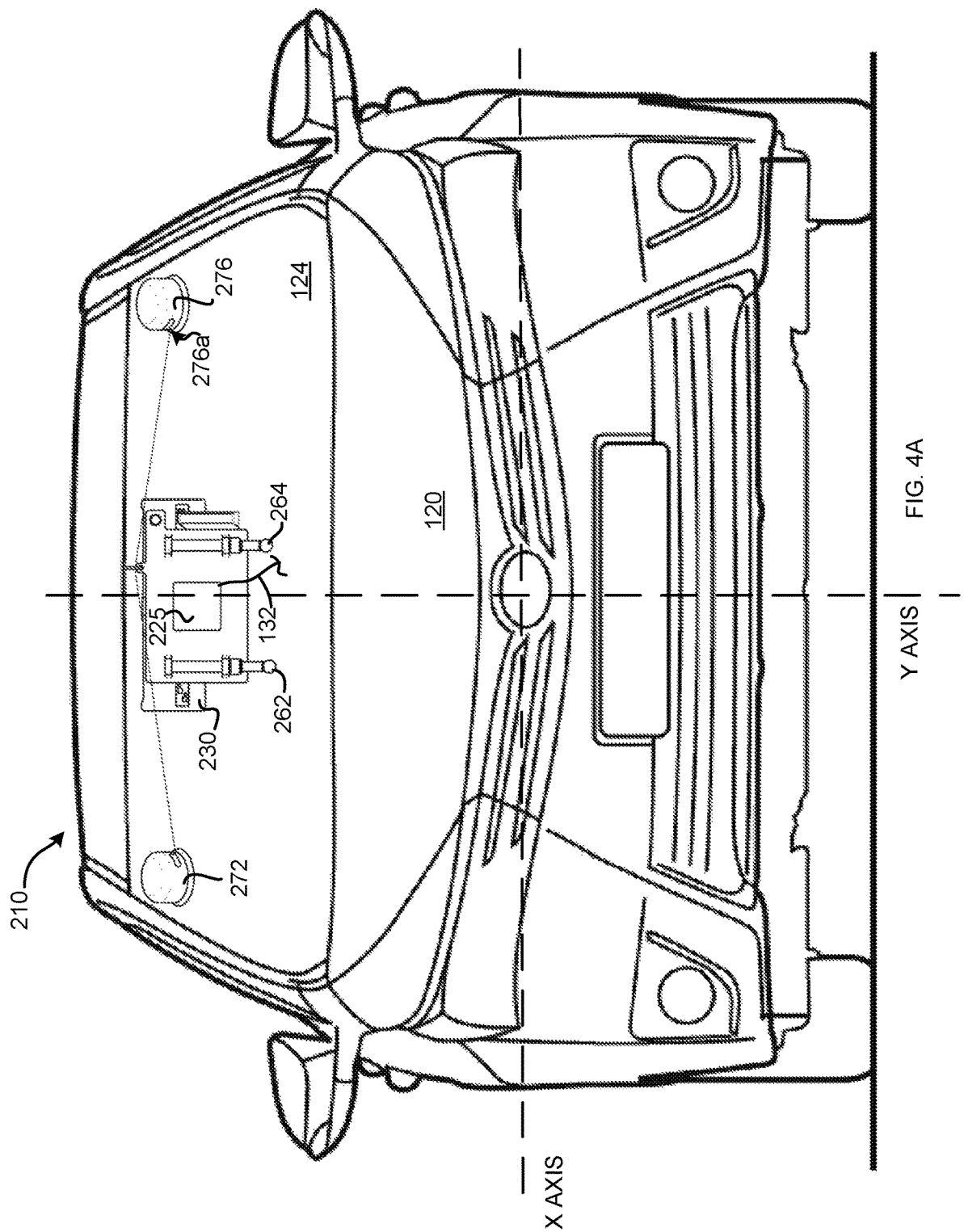
FIG. 4A is a front plan view of a vehicle having an adaptable electronic calibration target display unit mounted thereon, in accordance with one particular embodiment of the invention.
Figure 6:
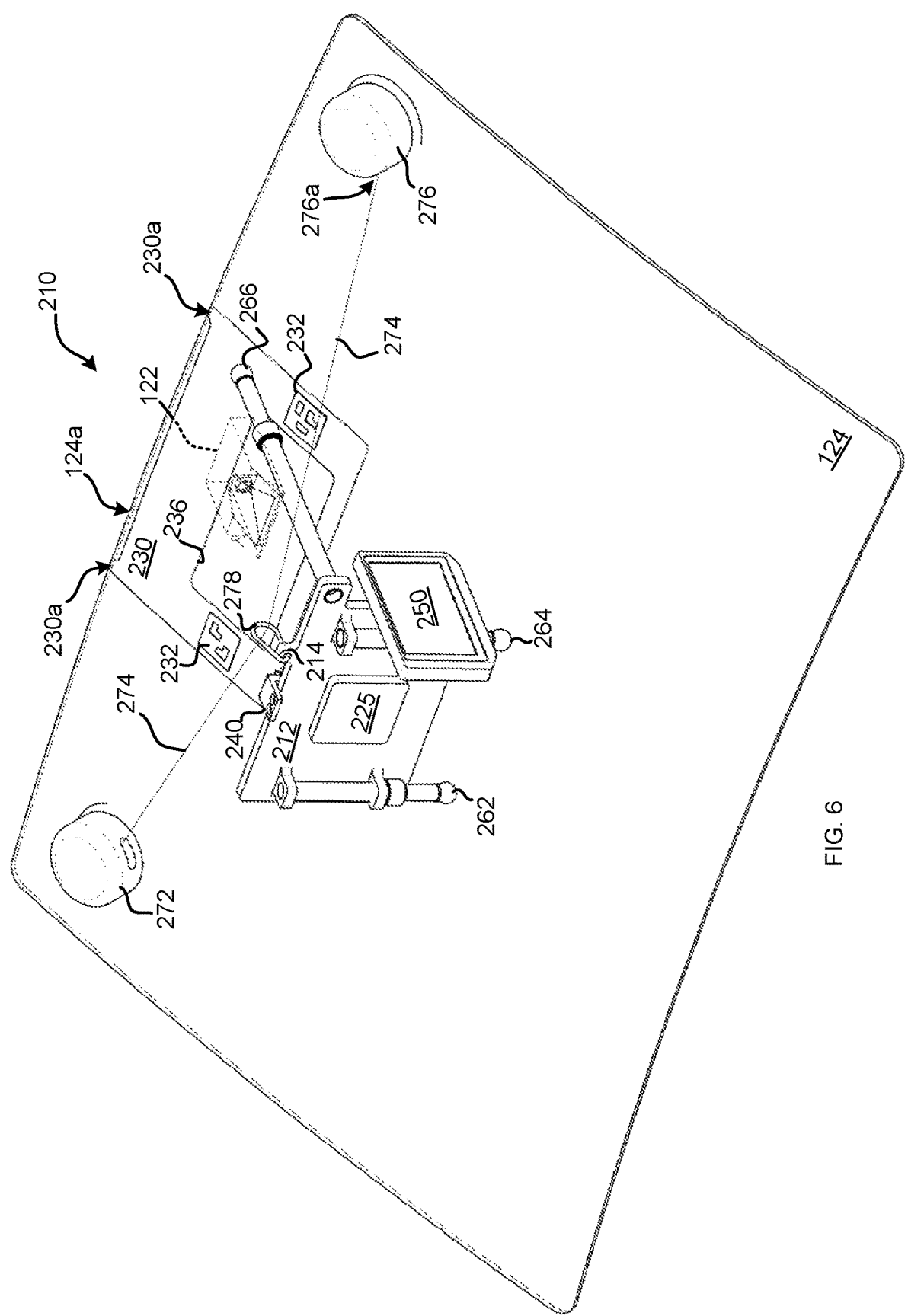
FIG. 6 is a front, perspective view of the adaptable electronic calibration target display unit of FIG. 5, mounted on a vehicle windshield in alignment the vehicle's forward-facing camera.
Figure 7:
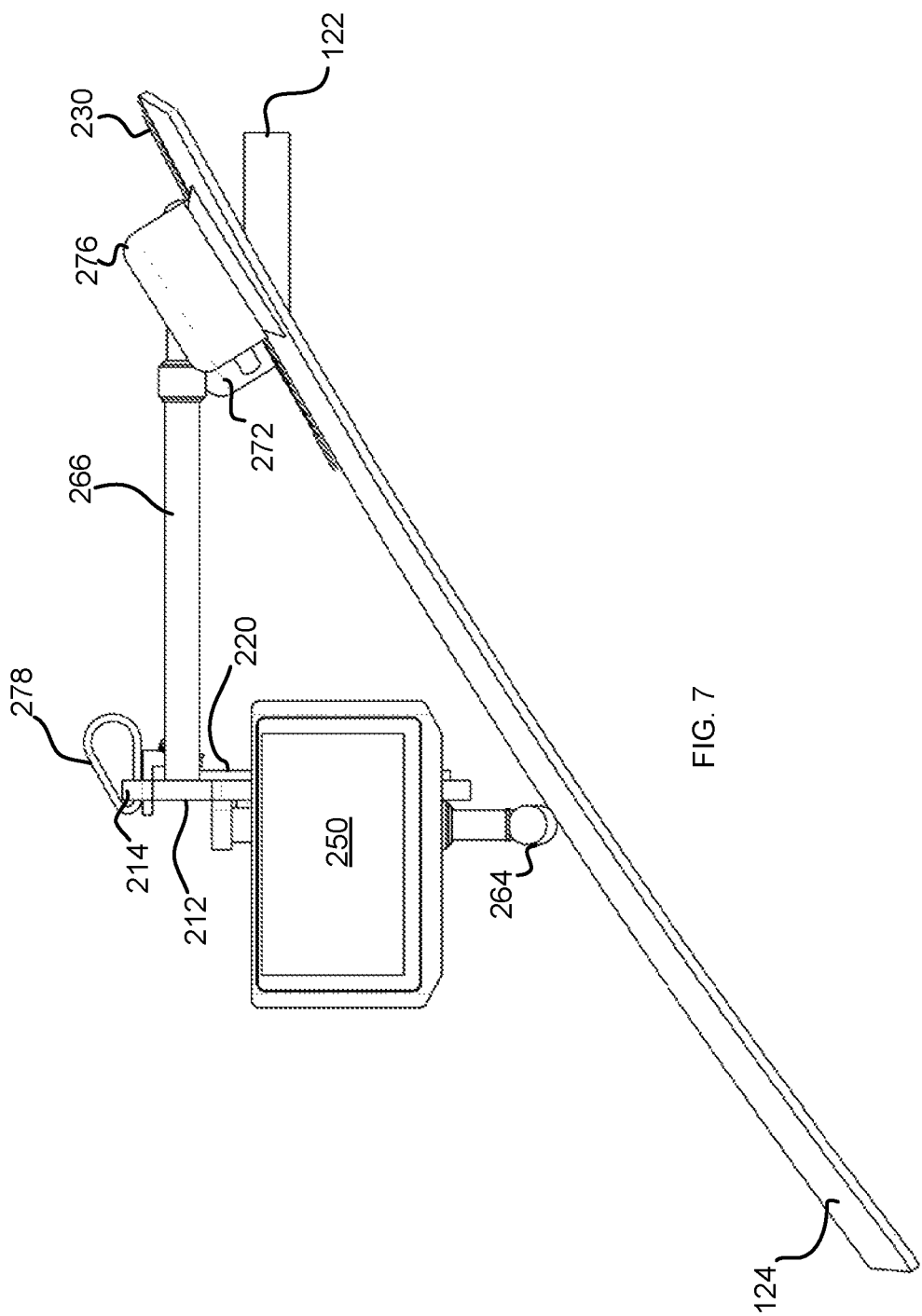
FIG. 7 is a side plan view of the adaptable electronic calibration target display unit of FIG. 5, mounted on a vehicle windshield in alignment the vehicle's forward-facing camera.
Figure 8:
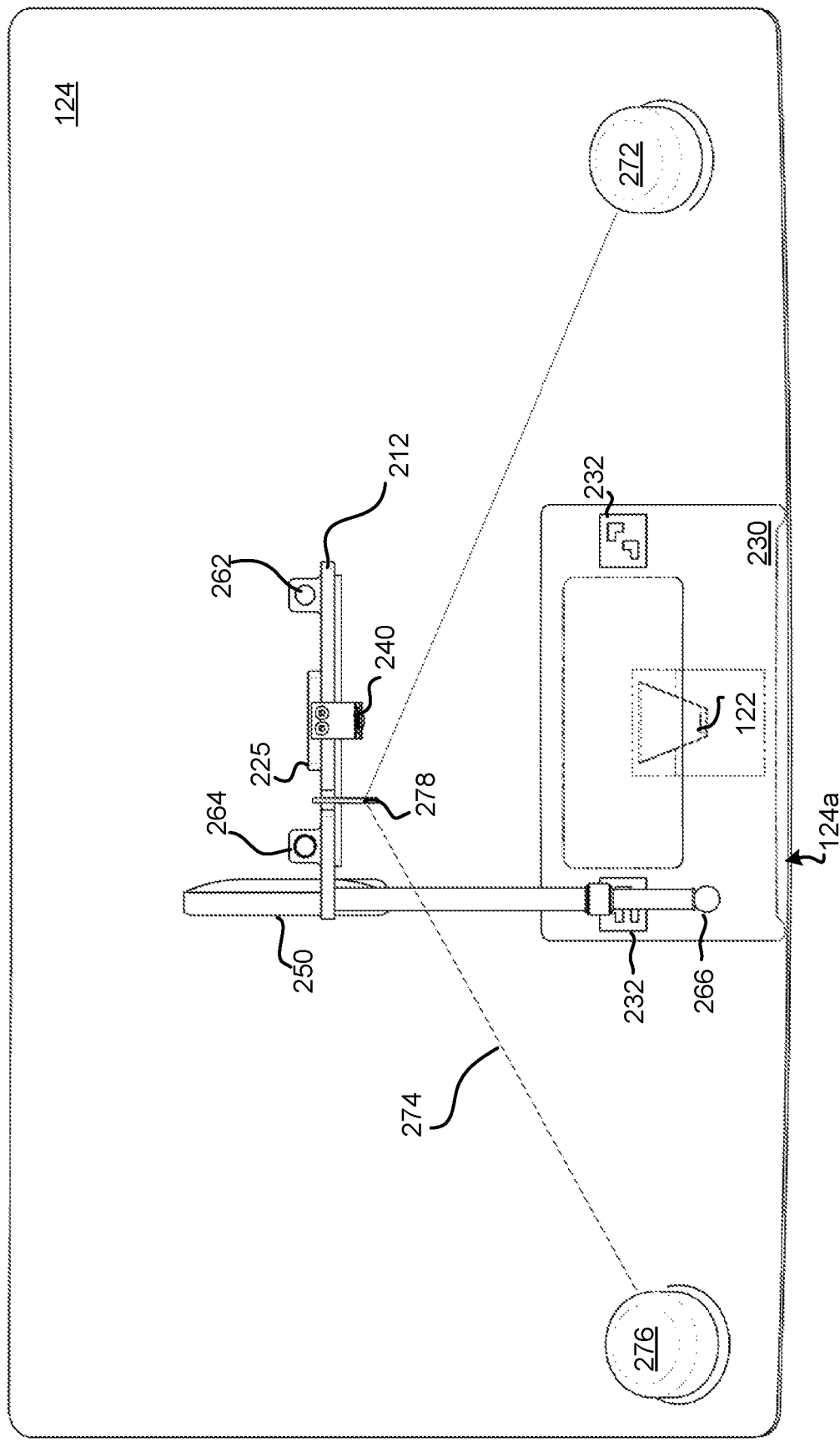
FIG. 8 is a top plan view of the adaptable electronic calibration target display unit of FIG. 5, mounted on a vehicle windshield in alignment the vehicle's forward-facing camera.
Figure 9:
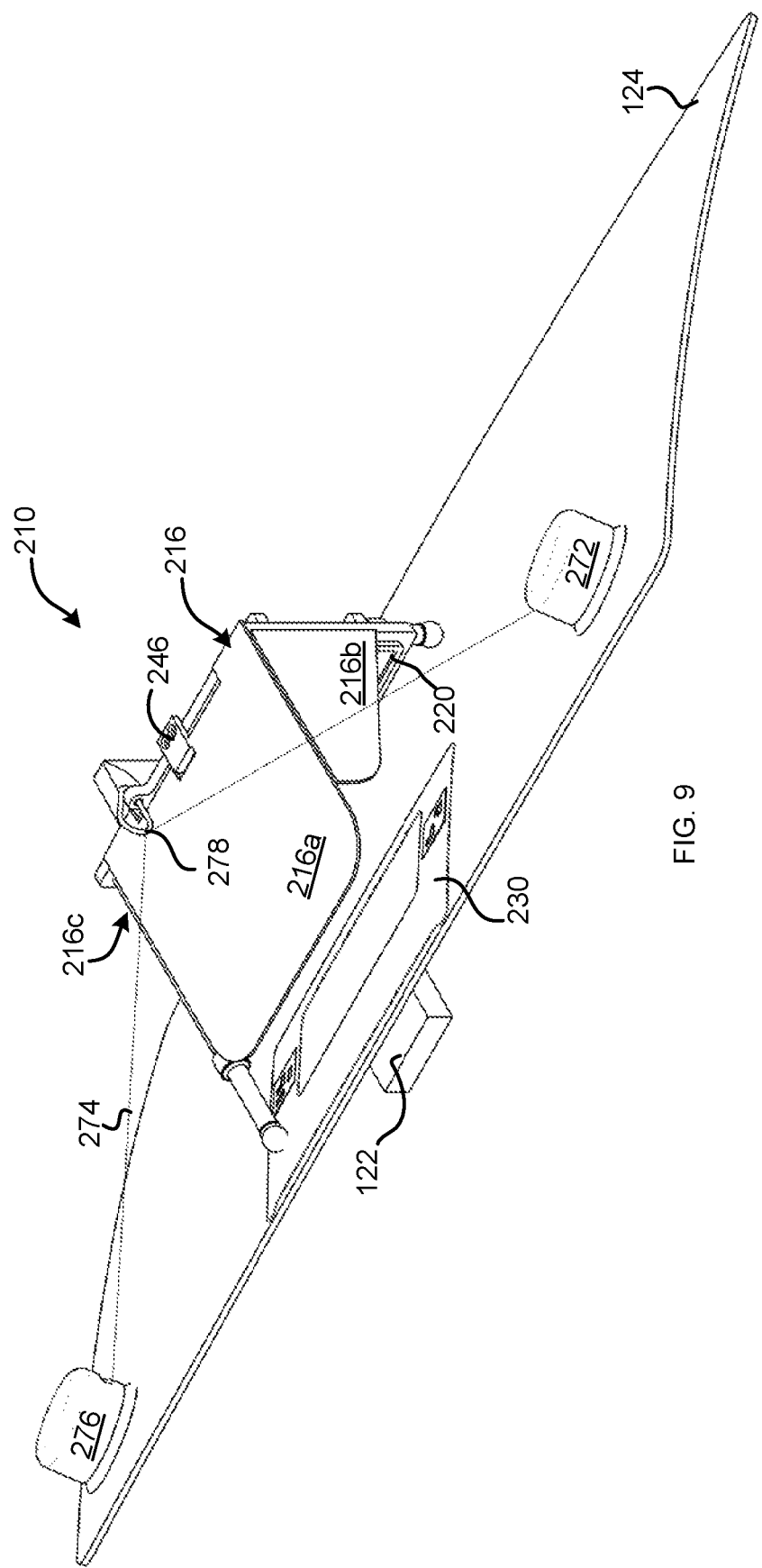
FIG. 9 is a top-down, perspective view of an adaptable electronic calibration target display unit, in accordance with another embodiment of the invention, mounted on a vehicle windshield in alignment the vehicle's forward-facing camera.
Figure 10:
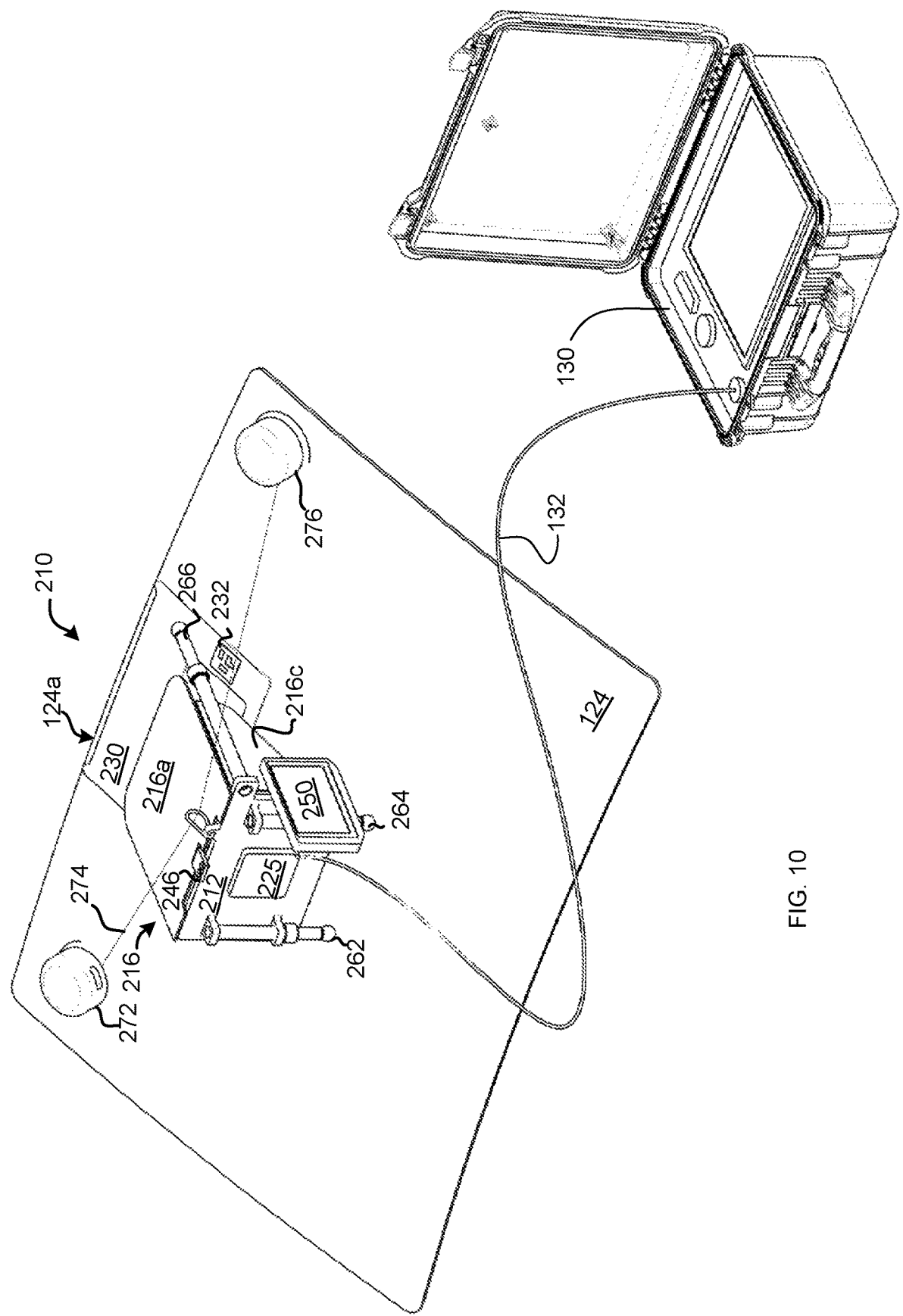
FIG. 10 is a perspective view of a portable forward-facing camera calibration system, in accordance with another embodiment of the invention.
Figure 11:
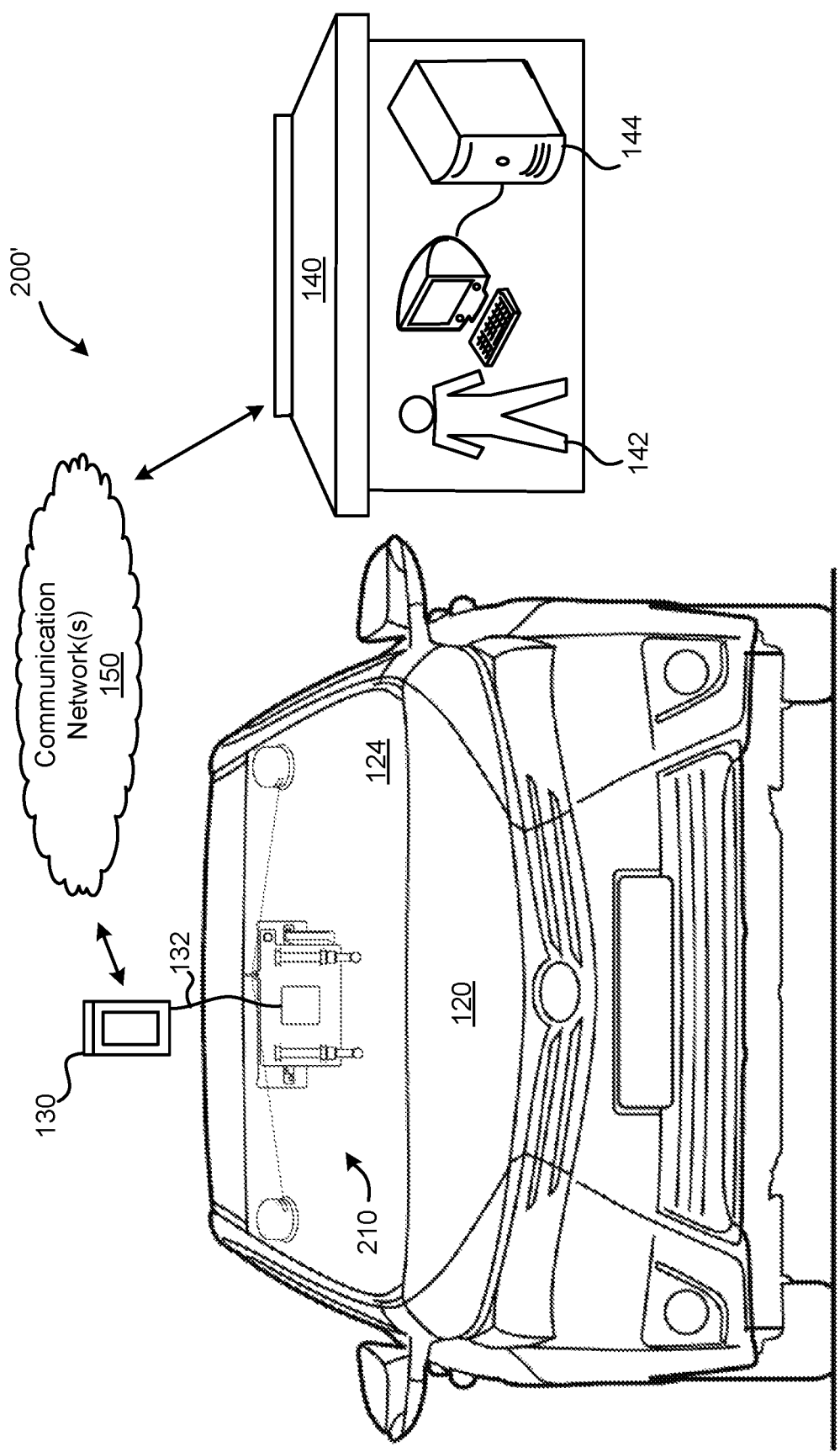
FIG. 11 is a simplified diagrammatic view of a system for calibrating a forward-facing camera of a vehicle using a portable mounting apparatus, in accordance with another particular embodiment of the invention.

Referring now to FIGS. 3-11, there is shown an optimized forward-facing camera calibration system 200 that will facilitate the calibration of an automotive camera system as part of an ADAS or other vehicle system, in accordance with one particularly preferred embodiment of the present invention. As with the system 100 of the previously described embodiment, the system 200 includes an adaptable electronic calibration tool or unit 210 in signal communication with a diagnostic tool 130, via cable 132. In one particular embodiment of the invention, the tool 130 includes its own processor and operator screen and can be used to load the particular OEM calibration information into the calibration system processor 225, via the cable 132, or wirelessly, if desired. In one particular embodiment of the invention, the tool 130 can be operated locally, by a local operator 134, without the use of a remote technician or control from a remote location, as illustrated in FIG. 3. In another particular embodiment of the invention, the tool 130 can be controlled from a remote location 140, wherein a remote technician 142 at the remote location 140 can load/adjust calibration targets via a communications network 150, as illustrated in FIG. 11.

In the present preferred embodiment, the calibration tool 210 includes, among other things, a frame 212 having mounted thereon: a presentation screen 220 in communication with a calibration system processor 225; a device camera 240, and an operator screen 250. The calibration tool 210 further includes, among other things, a reference marker 230, a mounting system 260 and a securing system 270.

The Presentation Screen:

The adaptable electronic calibration target display or presentation screen 220 provides a programmable image display surface that is used to present an adapted calibration target image 222 to the vehicle camera 122. The presentation screen 220 can display any image with the correct scale, position and lighting conditions required to calibrate the vehicle ADAS. Display 220 can be implemented using a flat panel display, such as an LED, elnk, OLED or LCD display. In particular, the display 220 receives an input signal to be displayed from a calibration processor 225 on the unit 210. In one preferred embodiment of the invention, the presentation screen is mounted on a frame 212 of the calibration tool 210.

In one particular embodiment of the invention, the display surface of the presentation screen 220 is aligned on the mounting system to be, in use, perpendicular to a plane defined by the four tire contact patches while the vehicle is on level ground. Optimally, the display surface of the presentation screen 220 is selected to have one or more of the following properties: low glare; no backlight; high contrast; and no power required to continuously display the calibration image. In one particular embodiment of the invention, the presentation screen includes an elnk display.

Figure 13:
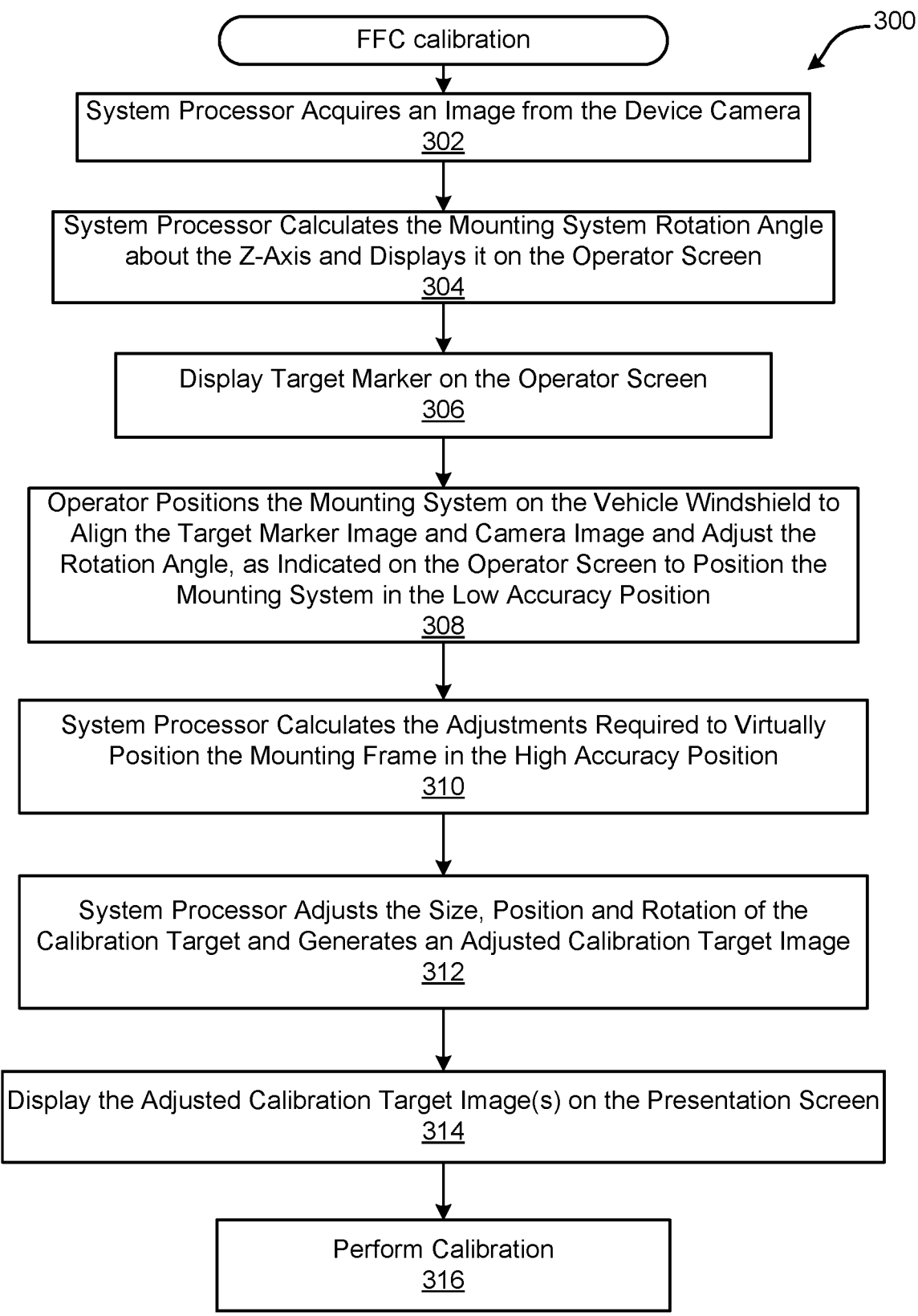
FIG. 13 is a simplified flow diagram of a method for displaying an adapted calibration target image, in accordance with one particular embodiment of the invention.

The Calibration System Processor:

The calibration system processor 225 is a computer processor that is configured by the execution of specialized software stored in non-transitory memory of the processor 225 to process the image data received from the device camera 240, and from the diagnostic tool 130, to generate an appropriately scaled, position-corrected calibration target 232 to be displayed on the presentation screen 220. Additionally, the image data is used provide position assistance information to the operator display 250, in order to allow the local operator 134 to position the mounting system 260 to a low accuracy position on the vehicle windshield 124. The operation of the calibration system processor will be discussed more fully below, in connection with FIG. 13.

In one particularly preferred embodiment of the invention, the adapted calibration target image generated by the calibration system processor 225 is scaled to simulate the OEM specified calibration target size, based on the presentation screen 220 being at a closer distance to the vehicle camera than the OEM specified distance.

The Device Camera:

The device camera 240 includes an image capture device 242, such as a lens and image sensor which, in one embodiment, is a charge coupled device (CCD) sensor, and image processing hardware 244, secured to a mounting bracket 246. The device camera 240 may be attached to the mounting system 260 or mounted remotely. In one particular embodiment of the invention, the image processing hardware 244 pre-processes the image data from the image capture device 242 and provides the pre-processed data to the system processor 225, for use in preparing the calibration targets 222. Alternately, if desired, raw image data can be provided to the system processor 225, which would then process the image data from the image capture device 242, as well as use the processed data to scale and position calibration targets.

In one particular embodiment, the camera 240 is mounted to the frame 212 of the unit 210, using the bracket 246, and oriented on the frame 212 such that it can be used to provide an image of the vehicle camera 122, the vehicle physical features around the vehicle camera 122, and the reference marker 230, to the system processor 225, when the unit 210 is mounted on the windshield 124 of the vehicle 120. The position of the center of the CCD sensor of the device camera 240 and the position of the center of the presentation screen display area of presentation display 220 are a known distance apart in three dimensions (X,Y,Z), which distances are known to the calculation algorithms of the system processor 225. In use, the device camera provides information to the calibration system processor 225, which further processes the data and presents a processed image to the operator of the unit, via the operator screen 250.

The Operator Screen:

In one particularly preferred embodiment illustrated, the operator screen 250 is additionally mounted on the frame 212 of the unit 210. The operator screen 250 takes processed images from the calibration system processor 225 and displays information to the operator about the calibration system unit 210, and its relative position on the vehicle 120. Using the information displayed on the operator screen 250, the operator can adjust the mounting system to roughly position of the calibration unit 210 on the vehicle 120.

In one particular embodiment of the invention, the operator screen 250 is removable from the frame 212 and connects to the calibration system processor 225 via a wire, or by a wireless communication network or connection, as desired. In one particular embodiment of the invention, the operator screen can be used to display reference geometry lines and/or shapes to assist the user in correctly positioning the mounting frame with reference to the position of the vehicle camera.

The Reference Marker:

The reference marker 230 is a marker sheet or indicator that can be placed on, or applied to, the vehicle windshield or vehicle body in the area around the vehicle camera 122 that needs calibrating, and is used to provide certain dimensional information about the vehicle 120 and the vehicle camera 122. Among other things, the reference marker 230 includes an opening 236 configured to surround the position of the vehicle camera 122, in use. The reference marker 230 is constructed to allow a very secure, temporary placement on the vehicle windshield. For example, the reference marker 230 can be made from, among other things, a cling, a weighted sheet, a decal or a sticker. In one particular embodiment, the reference marker 230 is made using a high tack silicone surface that can be placed against the clean surface of the windshield 124.

In a preferred embodiment of the invention, the reference marker 230 includes features that align with known features on the vehicle to provide a reference for rotation about the Z axis (i.e., longitudinal axis) of the vehicle. For example, in one particular embodiment of the invention, the reference marker 230 includes edges 230a that align with the top edge 124a of the vehicle windshield 124.

Additionally, the reference marker 230 includes fiducial marks 232 that are carefully positioned dimensionally to provide the device camera 240 with a reference to determine the mounting frame rotation around an axis perpendicular to the windshield surface. The fiducial marks 232 on the reference marker 230 also provide a horizontal position reference to allow the device camera 240 to determine the reference marker position relative to the vehicle camera 122. By placing the reference marker in alignment with known features on the vehicle (for example, with the top edge 124a of the windshield 124, near the centerline of the vehicle), the reference marker can provide a Z axis rotation reference to the calibration system processor through images acquired by the device camera 240.

The Mounting System:

In the present preferred embodiment, the mounting system 260 is the physical framework that permits the calibration unit to repeatedly locate the presentation screen 220 and device camera 240 relative to the vehicle camera 122 and vehicle body 120. In one preferred embodiment, the mounting system 260 additionally locates the device camera 240 and the presentation screen 220 in precise alignment on its frame 212, so that measurements taken with the device camera 240 can be used to properly position the calibration image 222 on the presentation screen 220. The mounting system 260 includes a frame 212 including three adjustable legs 262, 264, 266, which in one embodiment, include graduated markings that allow setting to predetermined lengths. Two of the legs 262, 264 are mounted to the frame 212 vertically with respect to the vehicle 120 (parallel to the vehicle's Y Axis (vertical axis)), and used to align the presentation screen with respect to rotation about the longitudinal axis (Z axis) of the vehicle. The third leg 266 is mounted to the frame 212 horizontal relative to the vehicle, and approximately parallel to the Z axis (longitudinal axis) of the vehicle. The third leg 266 is used to align the presentation screen 220 with respect to rotation around the transverse axis of the vehicle. In one particular embodiment of the invention, the legs 262, 264, 266 only touch the vehicle windshield 124 during normal operation.

In the present preferred embodiment, each of the three legs 262, 264, 266, are adjustable and include graduated markings to allow repeatable positioning of the unit 210. The predetermined lengths of the legs 262, 264, 266, are set to optimize the of the unit 210 on the vehicle undergoing calibration. By presetting the leg lengths, the rotation of the presentation screen 220 about the vehicles X axis (transverse axis) and Z axis (longitudinal axis) is constrained. By pre-measuring the calibration system position on a certain model of vehicle, and recording these dimensions, the vertical position of the presentation screen 220 can be repeated by other users on similar vehicles in the field by setting the lengths of the three legs 262, 264, 266, to the pre-measured dimensions.

Additionally, in one particular embodiment, the frame 212 holds the presentation screen 220 and device camera 240 in specific relative positions to the mounting system 260, and to one another. In one particular embodiment of the invention, the legs 262, 264, 266, are removable from the frame 212, for storage.

The Securing System:

The securing system 270 both holds the mounting system in place during calibration, and holds the mounting system on the vehicle to prevent damage to the vehicle. In one preferred embodiment of the invention, the securing system 270 includes, among other things, a first suction cup mount 272 including, attached thereto, a retractable cable 274. A second suction cup mount 276 is provided that includes an anchor point 276a to which the retractable cable 274 is removably secured. The retraction mechanism on the mount 272 provides some allowance for changing the length of the cable 274. It additionally provides for motion of the mounting frame in an up and down direction on the windshield, parallel to the longitudinal axis of the vehicle 120.

The securing system 270 additionally includes a hook 278 that is configured to be clipped to the retractable cable 274 and, when the cable 274 is connected to the anchor point 276a, to freely slide along the cable 274 between the two mounts 272, 276. Hook 278 is additionally configured to clip onto a loop 214 on the top edge 212a of the frame 212. In one particular embodiment of the invention, the hook 278 is or includes a carabiner style ring with a spring biased clasp, thus allowing for easy attachment and removal from the cable 274.

The hook and cable arrangement of the securing system 270 holds the mounting system in place on the vehicle windshield, while also allowing the mounting system 260 to be moved across the windshield surface in a "move and hold" type motion, when a force is applied by the operator. More particularly, the combination of the cable 274, suction cup mounts 272, 276 and ring 278, allows the mounting frame to be moved freely across the windshield in a horizontal direction parallel to the longitudinal axis of the vehicle, but prevents motion in the up and down directions parallel to the longitudinal axis of the vehicle.

Referring now to FIGS. 3-12, a method 280 for mounting a calibration tool 210 for calibrating a forward-facing camera of a vehicle using the system of FIGS. 3-11, in accordance with one particular embodiment of the invention, will now be described. First, the reference marker 230 is placed on the vehicle 120, near the vehicle camera 122 that requires calibration. Step 282. As discussed above, in one preferred embodiment, the reference marker 230 includes features that align with known features of the vehicle 120, to provide a reference for rotation about the Z-axis of the vehicle 120. For example, in the present preferred embodiment, the reference marker 230 is placed in alignment with the top edge 124a of the windshield, near the centerline of the vehicle 120, to provide a Z-axis rotation reference to the calibration system processor 225.

The securing system 270 is then attached to the vehicle windshield 124. Step 284. In one particular embodiment, the suction cup mount 272 including the retractable cable 274 is attached in the top corner of one side of the windshield 124, and the anchor point suction cup 276 is attached in the opposite top corner of the windshield 124. The retractable cable 274 is pulled from the retractable cable mount 272, and connected to the anchor point 276a of the anchor point mount 276. The hook 278 is mounted to the secured cable 274, such that it can freely slide along the cable 274, between the two mounts 272, 276.

After the securing system 270 is attached to the vehicle windshield 124, the mounting system 260 is prepared for placement of the frame 212 on the vehicle windshield. First, the length of each of the three legs 262, 264, 266 is adjusted to the size needed for a specific vehicle. Step 286. As discussed above, each leg includes graduated markings to allow repeatable positioning of the frame 212. A predetermined or pre-measured length for each of the legs 262, 264, 266 for each particular vehicle may be made available in a guidebook, look-up table and/or via the Internet. The mounting system 260 is then placed on the vehicle windshield 274. Step 288.

Once the mounting system is placed on the vehicle windshield 124, the hook 278, mounted on the cable 274 of the securing system 270, is attached to a loop 214 at the top edge of the mounting system frame 212. Step 290. Alternately, if desired, the hook 278 can be mounted to the loop 214, and from there, connected to the outstretched cable 274. Not only do the hook 278 and cable 274 from the securing system 270 hold the mounting system 260 in place on the vehicle windshield 124, but they also allow the mounting system 260 to be moved across the windshield surface, when force is applied by the local operator 134. In one particular embodiment of the invention, the local operator 134 moves the mounting system 260 to roughly position the mounting system 260 in a low accuracy location on the vehicle windshield, with the assistance of information provided to the local operator 134 on the operator screen 250. Step 292. As discussed above, the operator screen can be used while mounted to the frame 212 or, in one embodiment, may be removed from the frame 212 during use.

Once the mounting system 260 is roughly positioned relative to the reference marker 230 and vehicle camera 122, the calibration system processor 225 uses image data from the camera 240 to calculate the corrections required in order to position the calibration target image 222 in a high accuracy position on the presentation screen 220, and to the adjust the scale of the calibration target image 222, based on its distance from the vehicle camera 122. Step 294. The calibration procedure can then be performed. Step 296. In one particular embodiment of the invention, the calibration procedure uses an OEM or aftermarket calibration computer application to calibrate the vehicle camera 122.

After the calibration procedure has been performed, and the vehicle camera 122 has been calibrated, the calibration tool 210 can be removed from the vehicle. Step 298. If desired, the local operator 134 can then perform manufacturer recommended test drive instructions to check the proper functioning of the systems affected by the calibration that was just performed.

The system of the present invention will allow for calibration in a less controlled environment than other systems. Optimally, any outdoor space with reasonably dry weather conditions can be used. However, referring now to FIGS. 9 and 10, if desired, the calibration tool 210 can be further provided with an external light shield 216 disposed on the frame 212, and which shields the presentation screen 220 from ambient light. Light shield 216 is made up of the top portion 216a, attached to the top of the frame 212, but which includes cutaway portions for the camera bracket 246 and loop 214, and side portions 216b and 216c.

Referring now to FIGS. 3-13, there will be described a method 300 for calibrating the vehicle camera 122, in accordance with one particular embodiment of the invention. Once the calibration tool 210 has been placed on the vehicle 120 (steps 282-290 of FIG. 12), the device camera 240 acquires an image of the vehicle camera 122, the surrounding vehicle features (such as the windshield edge 124a) and the reference marker 230. Step 302. An image of the fiducial marks 232 of the reference marker 230, provided from the device camera 240 to the calibration system processor 225. Based on a vehicle selected from a library of vehicles, the calibration system processor computes the Z-axis rotation correction required for low accuracy placement of the mounting frame 260 vehicle windshield 124 and displays the calculated rotation angle on the operator screen 250. Step 304.

In one particular embodiment of the invention, the vehicle is selected from the library using the operator screen 250. In another embodiment of the invention, in which a remote technician 142 performs the calibration, as illustrated in FIG. 11, the remote technician 142 may select the vehicle and transmit the information to the system processor 225 via the communications network 150, or the local operator can select the vehicle via the operator screen 250, as desired.

Additionally, the device camera 240 provides an image of the vehicle camera 122 to the calibration system processor 225, and the calibration system processor presents an image of the required position of the vehicle camera, and the actual position of the vehicle camera, to the operator screen. In one particular embodiment of the invention, the actual camera position is indicated by an image of the actual vehicle camera 122 on the operator screen. A preferred location of the vehicle camera 122 is indicated on the operator screen 250 by a target locator or target marker. Step 306.

Figure 12:
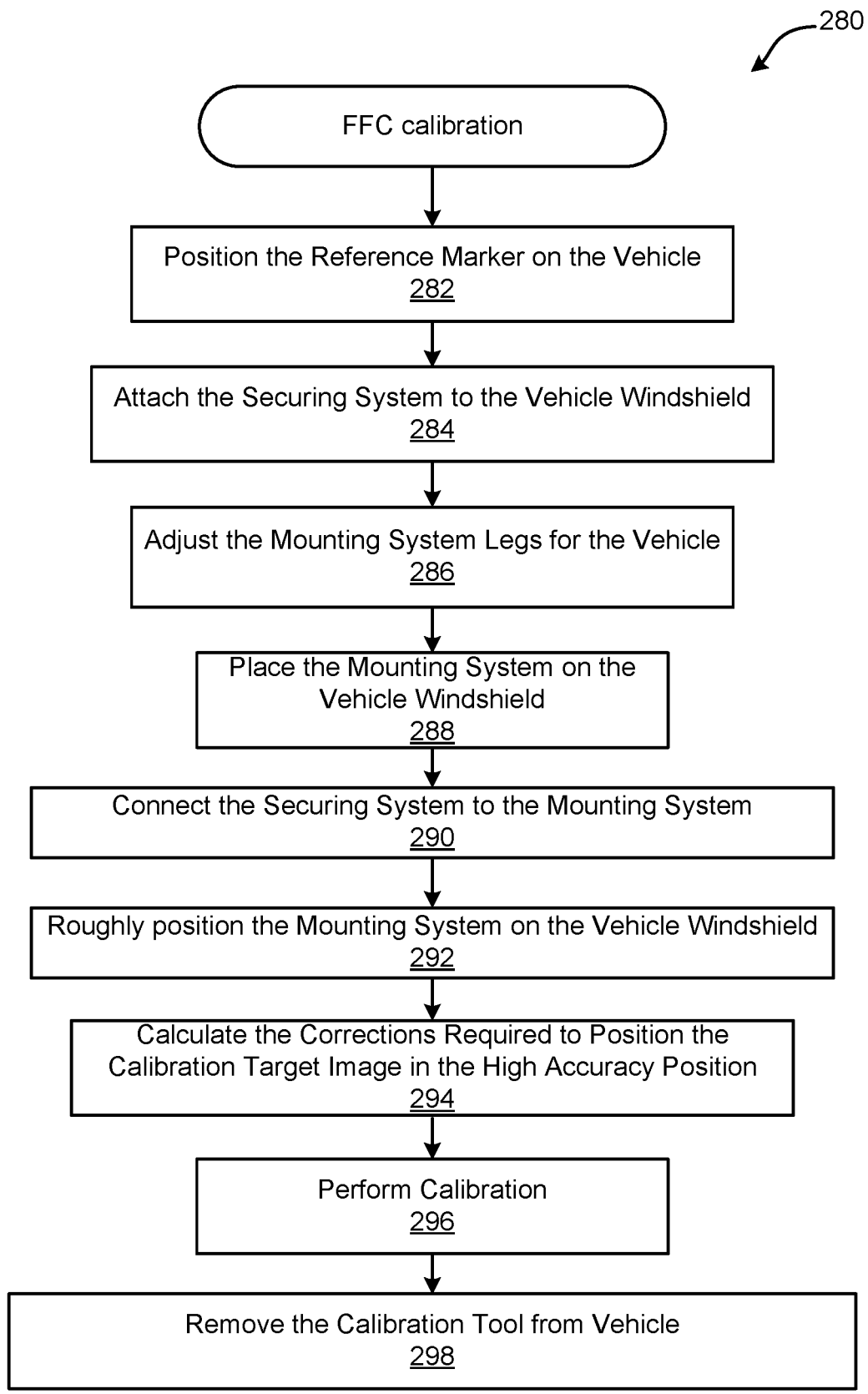
FIG. 12 is a simplified flow diagram of a method for using the system of FIGS. 3-11, in accordance with one particular embodiment of the invention.

The local operator 134 begins moving the mounting frame 260 to the low accuracy position, as described in connection with FIG. 12. More particularly, the local operator moves the mounting system 260 on the windshield 124 while watching the operator screen 250, to align the target marker image over the actual image of the vehicle camera 122 on the operator screen, to find the correct X and Y axis positions. The local operator 134 additionally adjusts the position of the mounting system 260 until a "0 degrees" indicator is displayed on the operator screen 250, indicating the correct Z axis rotation. Step 308. Thus, the local operator 134 uses the images presented on the operator screen 250 to adjust the position of the mounting system 260, by hand, into the low accuracy position.

More particularly, the local operator 134 moves the mounting system until the target marker indicating the preferred location of the vehicle camera 122 is moved to a position over the actual image of the camera 122 on the operator screen 250. This aligns the mounting system 260 in the X axis (vehicle transverse axis) and the Y axis (vehicle vertical axis) directions. As discussed above, the reference marker fiducial positions are used to calculate a rotation angle about the Z axis (vehicle longitudinal axis). The mounting frame 212 is rotated on the windshield 124 by the local operator 134 until the "0 degrees" rotation is indicated on the operator screen 250, meaning that the mounting frame is aligned to the correct low accuracy position relative to the rotation about the vehicle's Z axis. Thus, while the mounting system 260 is physically connected to the securing system 270, via the connection of the hook 278 with the loop 214, the local operator 134 pushes and pulls the mounting system 260 (and thus, the camera 240 and presentation screen 220) into the low accuracy position, by hand.

Once the local operator 134 has completed the physical positioning of the mounting system 260 to the low accuracy position, the calibration system processor 225 completes the alignment process by calculating the high accuracy "virtual" position of the mounting system 260 (and camera 240 and presentation screen 220). In one particular embodiment of the invention, the local operator 134 initiates this calculation, via the operator screen 250, once finished physically moving the mounting system 260.

The calibration system processor 225 acquires the final position of the mounting frame 212 using the actual vehicle camera position, and the position of the fiducial marks 232 on the reference marker 230. The system processor 225 then calculates the calibration target image display adjustments needed to compensate for the difference between the actual mounting system low accuracy position and a calculated high accuracy virtual position of the mounting system. Step 310 The calibration target is then adapted to adjust for size, position, and rotation (Step 312), before sending the final, adapted calibration target image 222 to the presentation screen 220 for display (Step 314).

The adapted calibration target image 222 that is ultimately displayed on the presentation screen 220 is displayed with the correct position and size, based on the actual position of the mounting system and the calculated adjustment needed to bring the actual position of the mounting system into virtual conformance with the high accuracy position of the mounting system needed to accurately calibrate the vehicle camera 122. To put in an oversimplified way, if the actual position of the mounting system 260 is a little bit too much to the left (or right, or at a slightly wrong angle), the system processor addresses this by generating an adapted calibration target image in which the position at which the calibration target image is displayed on the presentation screen 220, is digitally adjusted to compensate for the actual position inaccuracy.

In one particularly preferred embodiment of the invention, the local operator 134 (or, if desired, the remote technician in the embodiment of FIG. 11) initiates a high accuracy calculation in which the calibration system processor 225 calculates an error in the alignment of the X axis and Y axis positions by measuring the position of the vehicle camera 122 relative to the device camera 240 using machine vision techniques. The calibration system processor 225 then calculates the error in the Z axis rotation by measuring the position of the fiducial marks 232 on the reference marker 230 using machine vision techniques.

In the present preferred embodiment, the calibration system processor 225 then measures the distance between the vehicle camera 122 and the device camera 240 by calculating the position of the fiducial marks 232 on the reference marker 230 from the device camera, and then extrapolating the position of the vehicle camera using machine vision techniques. The calibration system processor 225 then uses the above-described calculations to determine the correct size and scale, position, and rotation of the calibration target image 222 to be displayed on the presentation screen 220. Thus, the system processor 225 adapts the calibration target image to the actual position of the calibration tool 210 on the vehicle 120.

Once the adapted calibration target image(s) is/are displayed on the presentation screen 220, the vehicle calibration process can be started by the local operator 134 (or the remote technician 142, in the embodiment of FIG. 11) to calibrate the FFC 122 in accordance with the OEM recommended process. Step 316.

The system of the present invention provides an adaptable calibration target image that is displayed on a vehicle mounted display at the derived proper angle, height, and distance from the FFC. The invention reduces the amount of space required to calibrate a FFC by approximately 83% (e.g., from 9' 10" down to 1' 5"). The invention provides an ADAS calibration tool that scales and positions a calibration target image on an adaptable electronic calibration target display that will: (1) reduce the amount of space necessary to calibrate FFCs; (2) be capable of digitally rendering all static calibration targets; (3) avoid suggested facility light, reflective tolerances and level requirements; (4) enable technicians to calibrate forward-facing cameras on vehicles in a greater number of physical collision or windshield replacement facilities or even in the field; and (5) save significant time and expense to the customer and his or her insurer.

It should be understood that the invention includes a device, a process of performing an optimized front-facing camera calibration through the front windshield of a vehicle, an algorithm, embodied in software stored in a non-transitory medium and executable by a processor, to generate the information necessary to calibrate the FFC. Additionally, the invention can be implemented in a number of ways without departing from the scope and spirit of the invention, including, but not limited to, the embodiments disclosed herein; dedicated devices with non-transitory stored firmware; and/or in software stored in non-transitory memory of a computing device including a processor that can be re-programmed as needed to perform this and other general tasks.

Further, although the preferred embodiment of the present invention is described as being mounted to the windshield of a vehicle, it should also be understood that the mounting system of the present invention could be adapted for placement on the hood of a vehicle, or at another location on the vehicle, instead of the windshield, without departing from the scope and spirit of the present invention.

Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims. Additionally, features from particular described embodiments may be interchanged with parts of different embodiments, without restriction.

We claim:

1. A system for calibrating a forward-facing camera on a vehicle, comprising:
    a calibration tool, including:
        a presentation screen;
        a mounting system configured to support said presentation screen on the vehicle, said mounting system moveable on the vehicle;
        said mounting system including three adjustable legs for changing the orthogonal position of said presentation screen relative to the forward-facing camera, at least one leg of said three adjustable legs being disposed orthogonally to at least one other leg of said three adjustable legs;
        an image sensor arranged to view the forward-facing camera when said mounting system is on the vehicle;
        a processor configured to receive image information from said image sensor and use said image information to determine a position of said mounting system on the vehicle relative to the forward-facing camera;
        said processor additionally configured to adapt at least one of a size or a position of a calibration target based on said determined position of said mounting system relative to the forward-facing camera and to generate an adapted calibration target image for display on said presentation screen.

2. The system of claim 1, additionally comprising a diagnostic tool connected to said calibration tool for facilitating a calibration procedure of the forward-facing camera.

3. The system of claim 2, wherein at least one of said diagnostic tool or said calibration tool is programmed from a remote location, via communications network.

4. The system of claim 1, wherein said processor is configured to use image data from said image sensor to determine a position of a center of the forward-facing camera, and to adjust the calibration target image for display on the presentation screen based on said position of said mounting system on the vehicle relative to the center of the forward-facing camera.

5. The system of claim 1, wherein the calibration tool includes a reference marker configured for placement on a windshield of the vehicle proximal to the forward-facing camera, said reference marker including one or more fiducial marks, said processor using image data of said one or more fiducial marks to determine a position of said mounting system relative to the forward-facing camera.

6. The system of claim 1, wherein said calibration tool further includes a securing system configured to mount to a windshield of the vehicle and secure said mounting system to the vehicle, said securing system configured to permit said mounting system to move horizontally on the windshield of the vehicle.

7. The system of claim 6, wherein said securing system includes two mounts and a cable connected between said two mounts, said securing system further including a clip configured to slide freely over said cable, between said two mounts, said mounting system including a loop for connection to said clip.

8. A system for calibrating a forward-facing camera on a vehicle, comprising:
    a calibration tool, including:
        a presentation screen;
        a mounting system configured to support said presentation screen on the vehicle, said mounting system moveable on the vehicle;
        an image sensor arranged to view the forward-facing camera when said mounting system is on the vehicle;
        a processor configured to receive image information from said image sensor and use said image information to determine a position of said mounting system on the vehicle relative to the forward-facing camera;
        said processor additionally configured to adapt at least one of a size or a position of a calibration target based on said determined position of said mounting system relative to the forward-facing camera and to generate an adapted calibration target image for display on said presentation screen;
        an operator screen in signal communication with said processor; and
        said processor is further configured to process position data of said mounting system relative to the forward-facing camera, and provide information to said operator screen about a target position to which the mounting system should be physically moved to provide proper physical alignment between the forward-facing camera and said presentation screen.

9. A calibration tool for generating an adjusted calibration target image for display to a forward-facing camera of a vehicle, the calibration tool comprising:
    a presentation screen;
    a mounting system configured to support said presentation screen on the vehicle in an orientation facing the forward-facing camera, said mounting system moveable on the vehicle;
    said mounting system including three adjustable legs for changing the orthogonal position of said presentation screen relative to the forward-facing camera, at least one leg of said three adjustable legs being disposed orthogonally to at least one other leg of said three adjustable legs;
    an image sensor arranged to view the forward-facing camera when said mounting system is on the vehicle;
    a processor configured to receive image data from said image sensor and use said image information to determine a position of said mounting system on the vehicle relative to the forward-facing camera;
    said processor additionally configured to adapt at least one of a size or a position of a calibration target based on said determined position of said mounting system relative to the forward-facing camera and to generate an adapted calibration target image for display on said presentation screen.

10. The calibration tool of claim 9, wherein said processor is configured to use image data from said image sensor to locate a center of the forward-facing camera, for adjusting the calibration target image for display on the presentation screen based on said position of said mounting system on the vehicle relative to the center of the forward-facing camera.

11. The calibration tool of claim 9, further comprising a reference marker configured for placement on a windshield of the vehicle proximal to the forward-facing camera, said reference marker including one or more fiducial marks, said processor using image data of said one or more fiducial marks to determine a position of said mounting system relative to the forward-facing camera.

12. The calibration tool of claim 9, further comprising a securing system configured to mount to a windshield of the vehicle and secure said mounting system to the vehicle, said securing system configured to permit said mounting system to move horizontally on the windshield of the vehicle.

13. The calibration tool of claim 12, wherein said securing system includes two mounts and a cable connected between said two mounts, said securing system further including a clip configured to slide freely over said cable, between said two mounts, said mounting system including a loop for connection to said clip.

14. A calibration tool for generating an adjusted calibration target image for display to a forward-facing camera of a vehicle, the calibration tool comprising:
    a presentation screen;
    a mounting system configured to support said presentation screen on the vehicle in an orientation facing the forward-facing camera, said mounting system moveable on the vehicle;
    an image sensor arranged to view the forward-facing camera when said mounting system is on the vehicle;
    a processor configured to receive image data from said image sensor and use said image information to determine a position of said mounting system on the vehicle relative to the forward-facing camera;
    said processor additionally configured to adapt at least one of a size or a position of a calibration target based on said determined position of said mounting system relative to the forward-facing camera and to generate an adapted calibration target image for display on said presentation screen;
    an operator screen in signal communication with said processor; and
    said processor is further configured to process position data of said mounting system relative to the forward-facing camera, and provide information to said operator screen about a target position to which the mounting system should be physically moved to provide proper physical alignment between the forward-facing camera and said presentation screen.

15. A method for calibrating a forward-facing camera of a vehicle, comprising the steps of:
    providing a calibration tool according to claim 9;
    placing the mounting system on an exterior portion of the vehicle, the image sensor arranged to view the forward-facing camera when the mounting system is on the vehicle;
    with the processor, automatically determining a position of the mounting system on the vehicle relative to the forward-facing camera; and
    with the processor, adapting at least one of a size or a position of a calibration target based on the determined position of said mounting system relative to the forward-facing camera and generating an adapted calibration target image;
    displaying the adapted calibration target image on the presentation screen; and
    using the adapted calibration target image to calibrate the forward-facing camera.

16. The method of claim 15, further comprising the steps of: placing a reference marker configured for placement on a windshield of the vehicle proximal to the forward-facing camera, said reference marker including one or more fiducial marks, said processor using image data of said one or more fiducial marks to determine a position of said mounting system relative to the forward-facing camera.

17. The method of claim 15, wherein said mounting system is placed on said vehicle windshield in said placing step, said method further comprising the steps of:
    before placing the mounting system on the vehicle windshield, mounting a securing system to the vehicle windshield, the securing system including two mounts and a cable connected between the two mounts;
    after placing the mounting system on the vehicle windshield, connecting the mounting system to the cable; and
    moving the mounting system horizontally along the windshield of the vehicle while the mounting system is connected to the cable to roughly position the mounting system on the vehicle relative to the forward-facing camera.

18. The method of claim 17, wherein the calibrating tool further includes an operator screen, and the method further includes the steps of displaying information of a position of the forward-facing camera on the operator screen and moving the mounting system on the vehicle to align a target marker with the position information of the forward-facing camera on the operator screen.

19. A method of generating an adapted calibration target image, comprising the steps of:
    providing a calibration tool, comprising:
        a presentation screen;
        a mounting system configured to support said presentation screen on the vehicle in an orientation facing the forward-facing camera, said mounting system moveable on the vehicle;
        an image sensor arranged to view the forward-facing camera when said mounting system is on the vehicle;
        a processor configured to receive image data from said image sensor and use said image information to determine a position of said mounting system on the vehicle relative to the forward-facing camera;
        said processor additionally configured to adapt at least one of a size or a position of a calibration target based on said determined position of said mounting system relative to the forward-facing camera and to generate an adapted calibration target image for display on said presentation screen;
    acquiring image data from the image sensor;
    displaying, on an operator screen of the calibration tool, a position indicator for the forward-facing camera and a target marker for alignment with the position indicator;
    moving the mounting system on the vehicle to align the target marker on the operator screen with the position indicator to move the mounting system to a low accuracy position relative to the forward-facing camera;
    automatically calculating, with the calibration system processor, adjustments required to virtually position the mounting system in a high accuracy position relative to the forward-facing camera;
    automatically adjusting, with the calibration system processor, at least one of the size, position or rotation of a calibration target using the calculated adjustments to generate an adjusted calibration target image for the adjusted calibration target;

displaying the adjusted calibration target image on the presentation screen;

calibrating the forward-facing camera using the adjusted calibration target image.

20. The system according to claim 1, wherein said processor is additionally configured to:

automatically calculate adjustments required to virtually position the mounting system in a high accuracy position relative to the forward-facing camera; and use the calculated adjustments to generate the adjusted calibration target image for the adjusted calibration target.

21. The calibration tool according to claim 9, wherein said processor is additionally configured to:

automatically calculate adjustments required to virtually position the mounting system in a high accuracy position relative to the forward-facing camera; and use the calculated adjustments to generate the adjusted calibration target image for the adjusted calibration target.

* * * * *